United States Patent [19]

Chung et al.

[11] Patent Number: 5,698,011
[45] Date of Patent: Dec. 16, 1997

[54] PROCESS FOR SEPARATING STERILANT GAS FROM DILUENT GAS THROUGH A SELECTIVE MEMBRANE

[75] Inventors: Hoo Young Chung, Bloomington; Stanley B. Miller, III, Eden Prairie; Donald R. Monson, West St. Paul; Timothy J. Walsh, Lakeville, all of Minn.

[73] Assignee: Donaldson Company, Inc., Minneapolis, Minn.

[21] Appl. No.: 854,236

[22] Filed: Mar. 20, 1992

[51] Int. Cl.$^6$ .................................... B01D 53/22
[52] U.S. Cl. .............................. 95/45; 95/48; 95/50
[58] Field of Search ............... 423/245.1, DIG. 14; 55/16, 71, 158; 95/45, 48, 50; 96/4

[56] References Cited

U.S. PATENT DOCUMENTS

| | | | |
|---|---|---|---|
| 4,249,917 | 2/1981 | Tarancon | 55/48 |
| 4,737,166 | 4/1988 | Matson et al. | 55/16 |
| 4,812,292 | 3/1989 | Joslyn | 422/31 |
| 4,824,444 | 4/1989 | Nomura | 55/16 |
| 4,828,810 | 5/1989 | Kruse et al. | 423/245.1 |
| 4,831,196 | 5/1989 | Buonicore et al. | 568/867 |
| 4,906,256 | 3/1990 | Baker et al. | 55/16 |
| 4,931,181 | 6/1990 | Blume et al. | 210/500.27 |
| 5,032,148 | 7/1991 | Baker et al. | 55/16 |
| 5,069,686 | 12/1991 | Baker et al. | 55/16 |
| 5,089,033 | 2/1992 | Wijmans | 55/16 |

*Primary Examiner*—Gary P. Straub
*Assistant Examiner*—Timothy C. Vanoy
*Attorney, Agent, or Firm*—Merchant, Gould, Smith, Edell, Welter & Schmidt

[57] ABSTRACT

A process for separating the components of a gas mixture, including a sterilant gas and a diluent gas is disclosed. The gas mixture is fed to a membrane separation unit within which a perm-selective membrane is located which allows migration of diluent gas and sterilant gas at different rates. Both sterilant-rich and diluent-rich gas streams are withdrawn from the membrane separation unit and optionally recovered or further processed to a less hazardous compound. The process may be utilized to separate and treat the constituents of the exhaust gases from a chemical sterilization process of which the common components are olefin oxides such as ethylene oxide as a sterilant and chlorofluorocarbons (freon) such as dichlorodifluoromethane (CFC-1) as a diluent.

1 Claim, 7 Drawing Sheets

PROCESS FOR SEPARATING STERILANT GAS FROM DILUENT GAS THROUGH A SELECTIVE MEMBRANE

BACKGROUND OF THE INVENTION

1. Field of the Invention

The present invention relates to a process for treating a gas stream containing a sterilant and a diluent component. More particularly, the invention relates to separation of a sterilant gas from a diluent gas through a perm-selective membrane, with subsequent processing or recovery of each component.

2. Description of the Prior Art

Sterilization processes are well-known and utilized in many industries for such processes as preparation of food products, preparation of medical and pharmaceutical products, packaging and medical applications. The medical industry is most likely the best-known environment within which sterilization processes are commonly used. Medical devices must go through the sterilization process prior to use or re-use in order to kill or inactivate contaminating microorganisms which may have a detrimental effect on patients. Radiation, steam or chemical sterilization processes are the three generally-known types. Chemical sterilization is, however, the only suitable process for devices constructed of such materials as plastic, paper, rubber or the like which cannot withstand the processing conditions necessary for effective operation of the other methods of sterilization.

Chemical sterilizing agents include such compounds as chlorine dioxide, hydrogen peroxide and olefin oxides, such as ethylene oxide or propylene oxide. The most commonly used in sterilization processes are the olefin oxides, which may be used in concentrated form or may be diluted with an inert diluent, such as nitrogen, carbon dioxide or a chlorofluorocarbon. The most commonly used olefin oxide is ethylene oxide which forms a potentially explosive mixture with air over the range of about 3% to 100% by volume ethylene oxide in air. Although concentrations of ethylene oxide within this explosive range do not impact its effectiveness as a sterilant, the equipment requirements and potential hazards associated with handling explosive gases warrant use of a diluent to maintain the concentration of ethylene oxide below the explosive limit of the mixture. The most commonly used diluents are the chlorofluorocarbons (CFC's) such as dichlorodifluoromethane (CFC-12). Other diluents such as nitrogen or carbon dioxide are not favored due to the requirement that the mixture would necessarily contain below 10 volume percent ethylene oxide in order to be classified as non-flammable. Such low concentrations would require redesign of process equipment and operation cycles within existing sterilization equipment. Thus, the use of an olefin oxide as sterilant in conjunction with a chlorofluorocarbon (CFC) as diluent has become the standard in chemical sterilization processes.

As disclosed by Buonicore et al. (U.S. Pat. 4,831,196), the chemical sterilization process is typically carried out in a chamber which is evacuated after the articles to be treated are placed within, followed by introducing the sterilant/diluent mixture which remains in the chamber from about 1 to 8 hours until the sterilization process is completed. After the sterilization period is completed, the gas in the chamber is exhausted and the sterilized articles removed. In order to ensure safe worker exposure levels, it is necessary to exhaust the chamber in a series of post-evacuations prior to entry into the chamber. The exhaust gases from each evacuation contain varying concentrations of sterilant and diluent, which decrease with each successive evacuation.

Both constituents of the exhaust gas, the sterilant olefin oxide, or more particularly ethylene oxide, and the diluent chlorofluorocarbon, pose hazards to workers and the environment. Ethylene oxide is highly toxic, while the chlorofluorocarbons are known to cause depletion of the ozone layer. The United States and many other nations are committed to reduce the production of chlorofluorocarbons to 50% of 1986 levels in the next decade. Consequently, a need exists for development of less hazardous sterilant and diluent compounds or the development of processes which reduce the hazardous effects of or allow recovery and re-use of existing sterilant and diluent compounds.

Hydrochlorofluorocarbons (HCFC's) have been identified as possible substitutes for chlorofluorocarbons utilized in solvent degreasing, foam-blowing and the construction of refrigeration and air conditioning equipment. Applicant believes such HCFC's may also be suitable as diluents for sterilization processes. Applicants are, however, unaware of such use to date. Although HCFC's have not been linked to destruction of the ozone layer, there is a continuing need to develop a sterilization system which allows recovery of such HCFC's if they were substituted for the CFC's. The basis for such need is derived from the economic benefit of recycling the HCFC constituent and from recognition that release of such compounds into the atmosphere may be linked in the future to detrimental environmental effects.

Chemical sterilization processes are utilized by both very small and very large users, ranging from a single sterilization unit to large industrial units. Processes developed for treating or recovering the exhaust gases from such a varied range of processing requirements must be economically feasible for the small user while satisfying the need to reduce worker exposure and detrimental environmental effects that may be more readily accomplished through a complex chemical process suitable for large scale industrial applications. Various methods have been devised by the art to treat gas streams containing chlorofluorocarbons and/or olefin oxides.

Joslyn (U.S. Pat. No. 4,812,292) discloses a process for recovering ethylene oxide or other chemical sterilants in the exhaust from a chemical sterilization process and converting such sterilants to glycols or other safe-to-handle compounds. In the case of ethylene oxide, the safe compound derived would be ethylene glycol. Joslyn discloses the utilization of non-catalytic hydrolysis to convert the olefin oxide to its glycol counterpart.

Kruse et al. (U.S. Pat. No. 4,828,810) disclose a reaction process in which ethylene oxide in dilute concentrations is treated by contacting the ethylene oxide with a solid, cationic ion exchange resin under conditions such that the quantity of water present in the reaction zone is sufficient to cause the ethylene oxide to form a derivative polymer which is bound to the cationic resin.

Buonicore et al. (U.S. Pat. No. 4,831,196) disclose a process for removal of olefin oxide in an exhaust gas by absorption and subsequent hydrolysis to its glycol counterpart. The remaining inert diluent is partially recovered by a compression-condensation step in a compressor.

Baker et al. (U.S. Pat. No. 4,906,256) disclose a membrane separation system for the treatment of air streams containing fluorinated hydrocarbons. The reference does not disclose the use of a membrane separation unit to treat a gas stream composed of a diluent and a sterilant or the separation of the diluent from the sterilant by means of a membrane separation process.

Baker et al. (U.S. Pat. No. 5,069,686) disclose a process for treating gas streams containing a sterilant gas and a diluent gas such as sterilizer exhaust streams. The process includes the use of a first treatment operation which may be any known process in the art for sterilant removal, including absorption and reaction methods, such as aqueous scrubbing, catalytic oxidation, exposure to solid or liquid reagents or absorption onto activated carbon. The residue gas stream, containing the diluent, is then passed through a membrane separation process in which the diluent is separated from air or nitrogen contained in the exhaust stream. The use of a membrane separation unit to treat the gas mixture containing both sterilant and diluent is not disclosed, nor is the possibility that a membrane separation unit may be utilized to separate the sterilant and diluent components.

Accordingly, a need exists for a process for treating a mixture of gases containing a sterilant and diluent component which incorporate the use of membrane separation technology to separate the diluent from the sterilant prior to treatment or recovery of the components. The present invention addresses this need as well as other problems associated with sterilant/diluent gas mixtures. The present invention also offers further advantages over the prior art, and solves other problems associated therewith.

SUMMARY OF THE INVENTION

The present invention provides a process for treating a gas stream containing a mixture of sterilant gas and diluent gas. The source of such mixture of gases includes the exhaust gases from chemical sterilization processes, exhaust gases from storage areas for sterilized equipment and exhaust gases from any process or working area that utilizes chemical sterilants. Chemical sterilants include such compounds as chlorine dioxide, hydrogen peroxide and olefin oxides, such as ethylene oxide or propylene oxide. The most commonly used of such compounds is ethylene oxide. In conjunction with such sterilant compounds, diluents are used to reduce the explosive or flammable properties of the sterilant. Diluents include such compounds as nitrogen, carbon dioxide or chlorofluorocarbons such as dichlorodifluoromethane. Dichlorodifluoromethane is the most commonly utilized diluent. The sterilant/diluent gas mixture will, in most cases, contain some air.

In all embodiments of the present invention, the sterilant/diluent gas mixture is fed to a membrane separation unit within which is enclosed a membrane that is perm-selective to either the diluent or sterilant component. By "perm-selective" it is meant that one or the other compound migrates through the membrane at a faster rate. Use of membranes to separate some components in a gas stream is known to the art. However, Applicants have discovered that the use of membranes is effective for separating sterilant gases such as ethylene oxide from diluent gases such as dichlorodifluoromethane which is believed unknown to the art. Furthermore, Applicants believe the feasibility of such separation would not be theoretically predicted based on molecule size, molecular weight, critical volume and solubility, the standard methods of predicting selectivity. These parameters indicate there would be limited selectivity between such constituent components when exposed to membranes known to the art. Any selectivity which could be predicted would indicate that diluent gases would pass through the membrane faster than the sterilant gases. Applicants have discovered that the reverse is true in the membranes tested to date and that selectivity is high for some membrane materials.

Appropriate membrane materials for the present invention would include, but are not limited to, silicone rubber, styrene butadiene rubber, plasticized poly-vinyl chloride, cellulose acetate, cellulose triacetate, polymethylpentene, polysulfone, polysulfone coated with silicone, polyether sulfone, polyether sulfone coated with silicone, polyaryl sulfone coated with silicone, polyaryl sulfone, polyimides, polyamides, polyphenylene oxides, chemically modified polyphenylene oxides and copolymers thereof, styrene-acrylonitrile copolymer, alumina based ceramic coated with silicone, alumina based ceramic coated with styrene-butadiene copolymer, alumina based ceramic coated with styrene-acrylonitrite copolymer, alumina based ceramic coated with PVC and copolymers thereof, polycarbonates, aromatic polyamides, polyvinylalcohol and copolymers thereof, polysulfone coated with cross-linked polyamide, sulfonated polysulfone, carboxylated polysulfone, polymeric epoxides and cross-linked polyurethanes. Applicants believe perm-selective layers of plasma polymerized coatings on a microporous membrane substrate as disclosed by Nomura (U.S. Pat. No. 4,824,444) would also be appropriate.

The physical configuration of the membrane may include membranes in the form of flat sheets, tubing, hollow fiber bundles, balloons or any other suitable configuration which allows exposure of the gas mixture to the surface of the membrane material while segregating the permeate gas which passes through the membrane for recovery. Composite membranes are also suitable for use in the process of the present invention which would include a microporous support material covered by perm-selective membrane materials, as disclosed above. The perm-selective layer would necessarily be as defect-free as possible to effect segregation of the constituent components. A third structural support layer may also be utilized if necessary to support the microporous support layer. The physical configuration of such composite membranes would encompass those physical configurations disclosed above.

Baker et al. (U.S. Pat. No. 5,069,686) disclose a process for treating mixtures of sterilant and diluent gas which first utilizes a processing step to chemically react or destroy by oxidation the sterilant component of the mixture followed by a membrane separation step within which the diluent gas is separated from air. The process of the present invention utilizes a membrane separation unit prior to treatment or recovery of the sterilant and diluent components. The membrane is utilized to separate sterilant from diluent even though one would hesitate to purify the ethylene oxide or other diluent which would become flammable or explosive on the permeate side of the membrane. Applicants believe use of the membrane separation step on the sterilant/diluent mixture allows use of a membrane when the volume of gas fed to the process from the sterilization equipment is small in quantity. With the invention disclosed by Baker et al., catalytic oxidation, in which large quantities of air must be added to the mixture, is completed prior to the membrane separation step which dramatically increases the volume to be processed through the membrane of that invention. Furthermore, the present invention is a simple process which may be utilized by both large and small users of chemical sterilization equipment ranging from single sterilization units in hospitals or labs to large-scale industrial manufacturers.

It has been proposed that chlorofluorocarbons which are detrimental to the ozone layer and environment be replaced with hydrochlorofluorocarbons or HCFC's. The configuration of the process of the present invention would allow substitution of such HCFC's without modifying the process. By separating the constituent components prior to catalytic oxidation of the sterilant component. Applicants believe possible detrimental reactions of HCFC's within the catalytic oxidation unit which may convert such compounds to environmentally detrimental compounds are reduced. The separated HCFC's may then be recovered and recycled in further processing equipment in the same form as originally supplied.

Although utilization of membrane separation of the diluent and sterilant component creates an explosive environment for the sterilant concentrated on the permeate side of the membrane, Applicants believe further processing of the sterilant component as disclosed herein eliminates any risk of such separation. Once separated, the constituent gases of the sterilant/diluent mixture may be further processed to eliminate toxic effects or detrimental environmental impact. As disclosed herein, such processings include addition of air on the permeate side of the membrane in sufficient quantity to dilute the sterilant-rich permeate passing through the membrane to a volume percent level below its explosive limit. This dilute stream may then be fed to a catalytic oxidation Unit where the ethylene oxide or other sterilant is converted to carbon dioxide and water. The diluent component may also be further processed to recover the chlorofluorocarbon or hydrochlorofluorocarbon material for re-use. This may be done by use of a flow expansion cooling nozzle to cool the diluent and condense that component. Alternatively, compression/condensation or refrigeration may be utilized to condense the diluent component.

Applicants have also discovered that the process of the present invention may be designed so that the diluent/sterilant mixture may be recirculated past a membrane surface area until the mixture is sufficiently depleted of one component so that the remaining concentrated component may be recovered.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENTS

Figure 3:
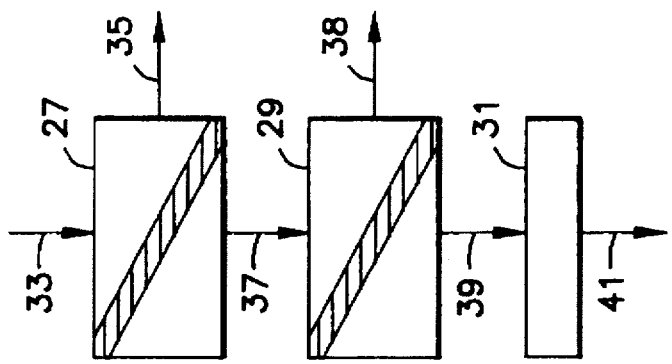
FIG. 3 is a schematic drawing of a two-stage membrane separation unit in which the sterilant-rich gas exiting the first membrane separation unit is fed to a second membrane separation unit and the further enriched sterilant-rich gas stream exiting the permeate side of the second membrane separation unit is fed to a sterilant recovery process.

As required, detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one skilled in the art to variously practice the present invention.

In the process of the present invention a gas stream containing both a diluent and a sterilant component is processed and/or treated. Mixtures of such gases are commonly used in chemical sterilization processes. The sterilant gas may include such compounds as chlorine dioxide, hydrogen peroxide or olefin oxides, such as ethylene oxide or propylene oxide. The most common chemical sterilant used industrially is ethylene oxide. Sterilants are usually mixed with a diluent to maintain a concentration of sterilant outside the explosive range of the mixture so that the chemical sterilization equipment need not be explosion-proof. Diluents used include such compounds as nitrogen, carbon dioxide or more commonly, chlorofluorocarbons such as dichlorodifluoromethane (CFC-12). The process of the present invention is particularly useful in treating the most commonly-used mixture of sterilant/diluent, ethylene oxide and dichlorodifluoromethane. One such mixture is sold commercially by Linde under the tradename Oxyfume® Sterilant Mixture 12 which is a 12 weight percent ethylene oxide, 88 weight percent dichlorodifluoromethane mixture. However, Applicants believe that the process disclosed herein may be utilized to treat any sterilant/diluent gas mixture.

The term "sterilant", for purposes of the present invention, is defined broadly as any gas capable of killing or inactivating contaminating microorganisms. Diluents, for purposes of the present invention, are any gas capable of forming a homogenous mixture with the sterilant gas while keeping the concentration of sterilant in the mixture below the explosive limit of the mixture.

As previously stated, the most common diluents are chlorofluorocarbons. As is well known, chlorofluorocarbons have been identified as chemicals which deplete the ozone layer surrounding the earth and cause detrimental effects to the environment. In other applications utilizing chlorofluorocarbons, such as foaming agents, degreasing solvents and aerosol propellants, a proposed substitute with less detrimental environmental impact are hydrochlorofluorocarbons (HCFC's). Applicants believe the process of the present invention provides unit operations capable of handling such substitution. In particular, it is believed that the present invention's capability of separating, by membrane separation technology, the sterilant from the diluent prior to catalytic oxidation of the sterilant, eliminates the possibility of reacting the HCFC's within the catalytic oxidation unit to form environmentally-hazardous compounds. This feature of the present invention is more particularly described below.

The process of the present invention is particularly useful as part of an industrial sterilization cycle. However, mixtures of sterilant and diluent, at least in dilute concentrations, must also be treated in the exhaust gases from storage areas used to store sterilized products, gases withdrawn from areas used to store or transfer sterilant gas mixtures, or any other work area where sterilant gas mixtures or residues may be present and the like. In a preferred embodiment, the present process is utilized to treat the exhaust gases from a chemical sterilization unit. Such sterilization is often carried out in a sealed chamber in which the articles to be treated are exposed to the sterilant/diluent gas mixture. When sterilization is complete, the chamber must be purged before it can be opened and the articles removed. Purging is typically carried out by repeated cycles of evacuation/flushing with air/evacuation. For example, the chamber may be pumped out by means of a vacuum pump down to a pressure of about 0.3 atmosphere. Air is then introduced and the resulting gas mixture is again evacuated. This process is repeated up to 6 times or more, until the chamber atmosphere is essentially free of sterilant gas. At this point, the chamber can be opened. Thus with each successive flushing, the exhaust gas contains progressively lower concentrations of sterilant and diluent and increased concentrations of air. Any or all of these gas mixtures may be subjected to the treatment process of the present invention.

In all embodiments of the present invention, a membrane separation unit is utilized as the primary unit operation to separate the diluent gas component from the sterilant gas component. Applicants, however, recognize that a membrane separation unit may be used in conjunction with a secondary sterilant/diluent separation process such as compression/condensation in a compressor, refrigerator or flash separation by passing a compressed sterilant/diluent mixture either upstream or downstream of the membrane separation unit through staged pressure drops which preferentially flashes the more volatile component while leaving the less volatile component in a liquid state. In other embodiments, such membrane separation process is utilized in conjunction with pre-treatment steps such as an optional moisture condensation step prior to the membrane separation unit or post-treatment steps applied to the separate diluent or sterilant gas streams such as catalytic oxidation of sterilant or condensation and recovery of the diluent component. The membrane separation step is described in detail below, followed by a detailed description of embodiments disclosing configurations incorporating the membrane separation unit and other unit operations.

1. Membrane Separation

The membrane separation process utilizes a perm-selective membrane to separate the diluent from the sterilant in all embodiments of the present invention. This separation may be done entirely by the membrane separation unit or in conjunction with other unit operations as previously disclosed. By perm-selective, Applicant means that the membrane material allows migration of the sterilant and diluent at different rates through the membrane material. In some instances, the sterilant may migrate at a faster rate while in others, the diluent may migrate at a faster rate. Furthermore, the ideal membrane would exhibit perfect selectivity, in that only one of the two components would permeate the membrane, however, Applicant believes in most instances, membrane materials will allow at least some permeation by both components of the gas mixture.

The gas mixture processed in the present invention, will also include air as a constituent. Although not discussed in each processing step, Applicants believe the present process is not affected by the presence of air and whether the membrane allows permeation by the air components is not important to operation of the present invention. Applicants, however, recognize that air present in the system will affect equipment design and sizing.

Many types of membranes are suitable for use in the membrane separation unit. A wide variety of membrane materials and physical shapes or configurations are known in the art. For example, the membrane may take the form of a homogenous membrane, an asymmetric membrane, a multi-layer composite membrane, a membrane incorporating a gel or liquid layer, or dispersed particulates, or any other form known in the art. Baker et al. (U.S. Pat. No. 5,069,686), which is incorporated herein by reference, disclose in general many possible configurations or physical structures of membranes. The membrane may be composed of a homogenous material such as silicone rubber and take the form of a flat sheet or a hollow tube. The membranes may also come in the form of a pre-manufactured hollow fiber bundle which dramatically increases the surface area available for permeation of a gas component. The membrane may also consist of a perm-selective coating plasma polymerized onto the surface of a microporous membrane substrate, as disclosed by Nomura (U.S. Pat. No. 4,824,444), which is incorporated herein by reference.

Perm-selective material suitable for separation of the constituents of a sterilant/diluent gas mixture may also include compositions which would not be physically self-supporting at the thicknesses necessary to allow sufficient migration across the membrane material. In these instances, a multi-layer membrane may be utilized. Such multi-layer membrane would include a microporous support layer which would have little resistance to flow relative to the perm-selective layer. The second layer or perm-selective layer would necessarily be as defect-free as possible in order to accomplish separation. The microporous support layer may be manufactured from such materials as polysulfone resins, poly-vinyl chloride or a highly sintered PTFE and the like. Optionally, the support membrane may be reinforced by casting it on a web. The multi-layer membrane then comprises the web, the microporous membrane, and the perm-selective membrane. The web material may be made from polyester or the like.

The membrane system of the present invention may also be comprised of a rubber-like balloon to which the sterilant/diluent gas mixture is transferred. The outside of the balloon would be swept with air so that the permeating sterilant is carried away while the diluent is contained within the balloon structure. The swept-away sterilant may be processed in a catalytic oxidizer as disclosed below. When a sufficient amount of sterilant has permeated the balloon-like membrane, the diluent-enriched stream remaining within the balloon structure may then be collected or processed by squeezing the balloon membrane or pumping the contents of such balloon membrane to a recovery system.

Alternatively, a membrane separation unit may include a bellows-type structure which is utilized to collect the permeate sterilant-rich or diluent-rich gas stream, which allows expansion and collapse by the volume of the gas stream under constant pressure. The membrane unit, such as a hollow fiber membrane bundle may be placed inside such bellows structure.

Applicants also believe that it may be necessary in a preferred embodiment to add moisture to the sterilant/diluent gas mixture to promote permeation of the sterilant. It may also be preferred to cool the gas mixture to approximately 40° F. or just above the condensation temperature of the mixture to promote permeation. In other embodiments Applicants believe it may be necessary to remove water by condensation prior to membrane separation of such components. This optional configuration is disclosed in FIGS. 6–10 and the discussion of these figures below.

It should be remembered that the form in which the membranes are used in the invention is not critical. The key to operation of a membrane separation unit is to allow the gas mixture containing both the sterilant and diluent to come into contact with the perm-selective layer of the membrane and isolating the gases which permeate the membrane. Such perm-selective membrane is necessarily as defect-free as possible so that separation of each constituent is possible based upon the selectivity of the membrane material. The selectivity of a membrane material for separation of the diluent and sterilant mixtures also is not critical to the present invention. A wide range of selectivities may be made functional by altering the surface area of the membrane, allowing for multiple membrane separations in that either the sterilant-rich or diluent-rich mixture is passed through a second or more membrane separation units until the desired purification of each constituent is accomplished. Furthermore, the non-permeate mixture may be recycled within a membrane separation unit until adequate permeation of one constituent has been accomplished based on the depletion of that constituent from the recycled feed to the membrane unit.

The choice of perm-selective material will depend on the separation to be performed and the desired physical configuration of the membrane unit. The key to selection is a degree of selectivity between migration of the diluent component versus migration of the sterilant components through the perm-selective layer. As previously stated, differences in the degree of selectivity may be compensated for by use of multiple separation units, variations in surface area of the membrane, or recycle of one of the constituent streams until adequate separation has been completed. Applicants believe that perm-selective materials and perm-selective materials in conjunction with a microporous support layer within the group consisting of silicone rubber, styrene butadiene rubber, plasticized poly-vinyl chloride, cellulose acetate, cellulose triacetate, polymethylpentene, polysulfone, polysulfone coated with silicone, polyether sulfone, polyether sulfone coated with silicone, polyaryl sulfone coated with silicone, polyaryl sulfone, polyimides, polyamides, polyphenylene oxides, chemically modified polyphenylene oxides and copolymers thereof, styrene-acrylonitrile copolymer, alumina based ceramic coated with silicone, alumina based ceramic coated with styrene-butadiene copolymer, alumina based ceramic coated with styrene-acrylonitrite copolymer, alumina based ceramic coated with PVC and copolymers thereof, polycarbonates, aromatic polyamides, polyvinylalcohol and copolymers thereof, polysulfone coated with cross-linked polyamide, sulfonated polysulfone, carboxylated polysulfone, polymeric epoxides, cross-linked polyurethanes and the like will provide adequate selectivity to be incorporated within the membrane separation units of the present invention. Furthermore, Applicants believe perm-selective materials such as siloxanes, organosiloxanes, fluorocarbons, hydrocarbons such as pyridine, styrene and the like which have been plasma polymerized onto a structured support material may be incorporated into embodiments of the present invention. The plasma polymerization can be done under vacuum or in the presence of hydrogen, nitrogen, oxygen, helium, air or mixtures thereof.

Applicants believe that certain membrane materials will allow sterilant gas to pass through the membrane at a faster rate than the diluent gas while other membranes may allow permeation of the diluent gas at a faster rate. In a preferred embodiment, a membrane is selected which preferentially allows permeation of the sterilant gas as disclosed in the examples accompanying this disclosure.

In all embodiments of the present invention, a membrane separation unit is utilized to separate the sterilant gas component from the diluent gas component prior to treatment or recovery of either constituent. This separation may be completed by membrane separation alone or in conjunction with other unit operations such as flash distillation, refrigeration, compression/condensation. Baker et al. (U.S. Pat. No. 5,069,686) disclose a process for treating sterilant/diluent gas mixtures in which the sterilant component is first treated by catalytic oxidation, absorption or the like. This effectively removes such component from the stream prior to a membrane separation step which is utilized to separate the diluent from air or nitrogen. The present invention utilizes membrane separation to first separate the sterilant from the diluent. This provides several advantages. Catalytic oxidation of the sterilant component in either the present invention or the process disclosed by Baker et al. requires the introduction of air as a reactant. This air must be processed through the membrane separation unit disclosed by Baker et al., while the configuration of the present invention allows separation of sterilant from diluent prior to introduction of such air and greatly reduces the total volume of gas which must be passed through the membrane separation unit.

The membrane separation process is preferably a pressure-driven process, wherein the permeants cross the membrane under a gradient provided by a partial pressure difference for each permeant between the feed and permeate sides. The pressure drop across the membrane can be achieved by pressurizing the feed, by evacuating the permeate side, or by both. Because the volume of the permeate stream is most likely smaller than the volume of the feed, it is generally preferable to operate in the vacuum mode, that is to draw a partial vacuum on the permeate side, rather than to compress the whole of the feed gas stream to a high pressure. However, in possible embodiments of the invention where the feed gas stream is at high pressure, because of having passed through a compression/condensation step, for example, it may be possible to utilize the high pressure of the feed and dispense with the permeate vacuum pump.

The pressure difference from the feed side of the membrane to the permeate side will affect the rate of migration of constituents. This pressure difference may be adjusted to maximize recovery of the component which permeates the membrane. Furthermore, the required pressure difference will vary with the membrane material selected and the thickness of the manufactured perm-selective layer. Thus, the membrane separation step must be designed and tailored to the particular requirements of the sterilization operation or gas mixture to be processed designing according to percentage of diluent and sterilant to be separated and the desired purity of the separated components. Many possible embodiments of the separation unit, configured with both upstream and downstream unit operations are possible to accomplish the goal of the present invention, namely to separate and recover or alter the diluent and sterilant components of the gas mixture. These configurations are more particularly described below.

2. Process Configurations

Several process configurations are detailed below in which a sterilant/diluent gas stream is treated. In each configuration, or preferred embodiment, a sterilant/diluent gas mixture is fed to the recovery process. The source of such gas mixture may be the exhaust from a sterilization process fed directly to the recovery unit. In an alternative preferred embodiment, the exhaust gases from sterilization processes or other sources of sterilant/diluent gas mixtures may be collected in a holding tank located prior to the treatment processes disclosed below. When such tank has recovered a sufficient quantity of sterilant/diluent gas mixture, the tank may be isolated from the sterilization processes and fed to the treatment process in a batch operation. To be certain that the sterilization units may be utilized at any time, two such collection tanks may be incorporated in a preferred embodiment so that one tank may be available at all times to receive exhaust gases from the sterilization process or other source of sterilant/diluent gas mixture. While the other tank is isolated from such source of gas and feeding the gas mixture to the treatment process.

Figure 1:
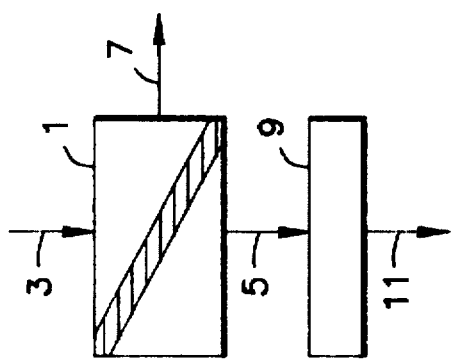
FIG. 1 is a schematic drawing of a single stage membrane separation unit in which the sterilant-rich gas stream is fed to a sterilant recovery or modification process.

Referring now to FIG. 1, which depicts a preferred embodiment of the present invention incorporating a membrane separation unit (1) and a sterilant treatment process (9), for processing the sterilant-rich stream, which may consist of a catalytic oxidation unit or an ion exchange system. Catalytic oxidation systems are well-known in the art for treating such sterilants as ethylene oxide by converting such compound to harmless carbon dioxide and water in accordance with the following equation:

$$2C_2H_4O + 5O_2 \xrightarrow{cat} 4CO_2 + 4H_2O + heat$$

The source of $O_2$ is usually air, thus a large quantity of $N_2$ also flows through the catalytic oxidation unit. As disclosed by Baker et al. (U.S. Pat. No. 5,069,686), such catalytic oxidation Units may use a catalyst, such as Hopcalite and heat the gas stream to about 330° F. to accomplish oxidation. Applicants are also aware of commercially-available catalytic oxidation units such as the ETO-Abator™ available from Donaldson Company, which would be incorporated in a preferred embodiment of the present invention. The use of an ion exchange resin system for treatment of a sterilant gas is also known in the art as disclosed by Kruse et al. (U.S. Pat. No. 4,828,810), which is incorporated herein by reference. The treatment unit (9) could include an ion exchange system as disclosed by Kruse et al. in place of a catalytic oxidation unit.

Furthermore, in all embodiments of the present invention the Applicants believe the sterilant-rich gas may be bubbled through water in the presence of a catalyst to convert the oxide sterilant to a glycol. The catalyst could be incorporated into the membrane material and the permeate side of the membrane filled or flooded with water to accomplish such reaction. In each disclosed embodiment which follows the use of such conversion of oxide to glycol is a possible alteration of the disclosed embodiments.

The sterilant/diluent mixture is fed to the membrane separation unit (1) through line (3). As previously disclosed, this mixture may contain varying quantities of air, depending upon the source of such gas stream to be treated. The diluent-rich gas stream exits the feed side of the membrane separation unit (1) through line (7). The sterilant-rich gas stream exits the permeate side of the membrane separation unit through line (5) and is fed to the sterilant-treatment process (9). The products of the sterilant-treatment process (9) exit the process through line (11) and would generally be vented to the atmosphere due to their non-hazardous properties.

Figure 2:
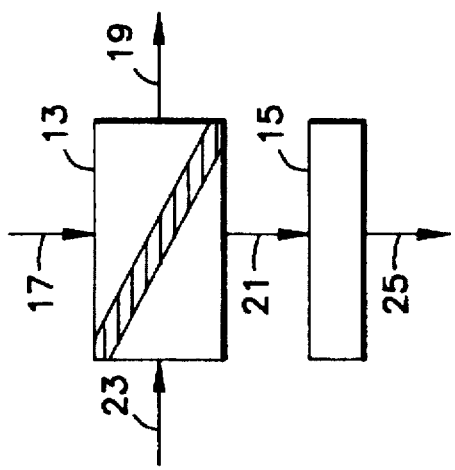
FIG. 2 is a schematic drawing of a single stage membrane separation unit in which the sterilant-rich gas stream is fed to a catalytic oxidizer and air is introduced on the permeate side of the membrane to dilute the sterilant-rich gas stream.

Now referring to FIG. 2, which depicts another preferred embodiment of the present invention in which a sterilant/diluent gas mixture is fed to a membrane separation unit (13) through line (17). The gas mixture may be any composition containing such sterilant and diluent component as previously disclosed. The diluent-rich gas stream leaves the feed side of the membrane separation unit (13) through line (19). On the permeate side of the membrane, a quantity of air is added to the unit through line (23) as a diluent for the sterilant-rich stream passing through the membrane. This allows maintaining the concentration of sterilant in the sterilant-rich stream below the explosive level of such component, which is about 3% by volume in air for ethylene oxide as sterilant. Furthermore, this air supply is utilized as a reactant in subsequent catalytic oxidation in the catalytic oxidation unit (15). The sterilant-rich gas stream with the air added through line (23) exits the permeate side of the membrane separation unit (13) through line (21) and is fed to the catalytic oxidation unit (15). The oxidation products leave the catalytic oxidation unit (15) through line (25) and again are vented to the atmosphere.

Next, please refer to FIG. 3, which depicts a multi-stage membrane separation unit utilized to improve the separation of sterilant from diluent gases when some of the diluent gas passes through the membrane of the first unit. The sterilant/diluent gas mixture is fed to a first membrane separation unit (27) through line (33). The source of such mixture may be any such process as previously disclosed. The diluent-rich gas stream exits the feed side of the first membrane separation unit (27) through line (35). The sterilant-rich gas stream which also contains a quantity of diluent exits the first membrane separation unit (27) through line (37) and is fed directly to a second membrane separation unit (29). The diluent-rich gas stream from the feed side of the second membrane separation unit (29) exits such membrane separation unit through line (38). The sterilant-rich gas stream on the permeate side of the second membrane separation unit (29), now sufficiently free of diluent, exits the second membrane separation unit (29) through line (39) and is fed to either a catalytic oxidation unit or ion exchange system (31) as previously disclosed for the embodiment of FIG. 1. The products of catalytic oxidation or ion exchange processing exit the unit through line (41) and will generally be vented to the atmosphere. Applicants recognize that a third, fourth or even more successive membrane units may be utilized if separation requirements are not met with less stages.

Figure 4:
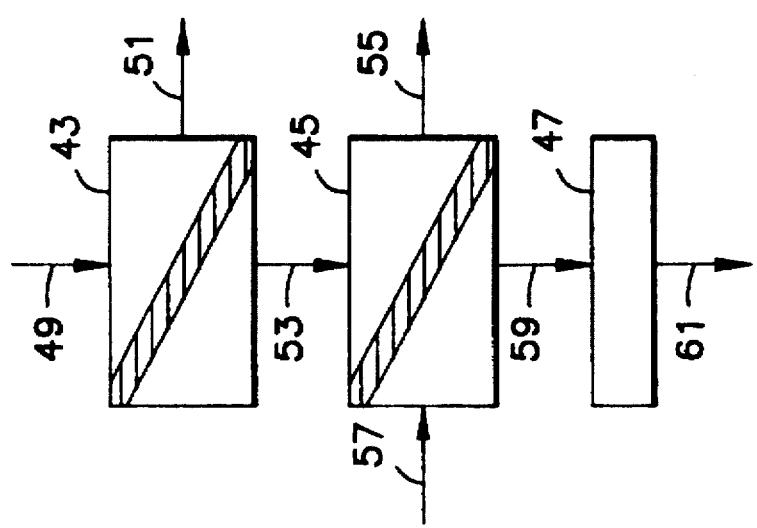
FIG. 4 is a schematic drawing of a two-stage membrane separation unit wherein the sterilant-rich gas stream exiting the second membrane separation unit is diluted with air prior to being fed to a catalytic oxidizer.

Next referring to FIG. 4, a multi-stage membrane separation unit similar to that disclosed in FIG. 3 is disclosed. A sterilant/diluent gas mixture as previously disclosed is fed to a first membrane separation unit (43) through line (49). A diluent-rich gas stream exits the first membrane separation unit (43) through line (51). A sterilant-rich gas stream containing some diluent exits the permeate side of the first membrane separation unit (43) through line (53) and is fed directly to a second membrane separation unit (45). The diluent-rich gas stream exits the feed side of the second membrane separation unit (45) through line (55). On the permeate side of the second membrane separation unit (45), a sufficient quantity of air for catalytic oxidation is added through line (57). As previously disclosed, the air must also be of sufficient quantity to dilute the sterilant stream to a level below its explosive limit of about 3% by volume in air for the commonly-used sterilant ethylene oxide. The diluted sterilant-rich gas stream leaves the second membrane separation unit (45) through line (59) and is fed directly to the catalytic oxidation unit (47). The products of such catalytic oxidation exit the catalytic oxidation unit (47) through line (61).

Figure 5:
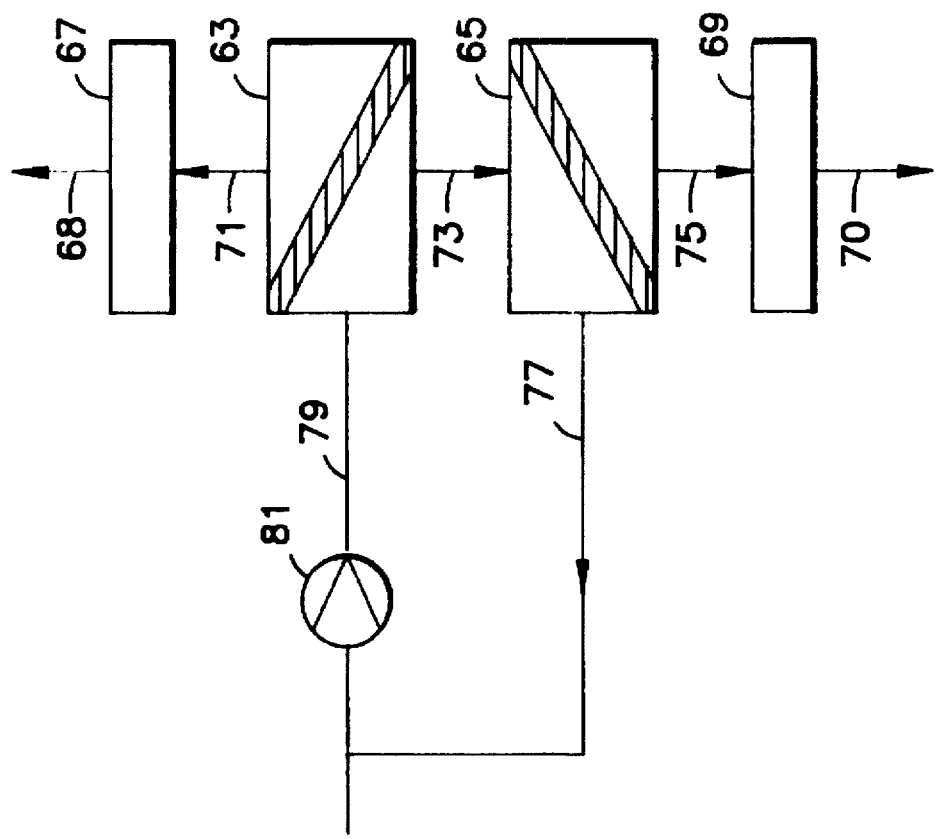
FIG. 5 is a schematic drawing of a membrane separation system in which the sterilant/diluent mixture is recycled until the stream is sufficiently depleted in sterilant concentration.

Next refer to FIG. 5, which depicts a preferred embodiment disclosing the use of recycle to accomplish adequate separation of the sterilant from the diluent. A pump (81) is used to feed the sterilant/diluent gas mixture to the membrane separation units through line (79). In the embodiment pictured, two membrane separation units (63) and (65) are disclosed. However, a single unit could also be utilized. The sterilant/diluent gas mixture enters the first membrane separation unit (63) through line (79). The diluent-rich gas stream exits such unit through line (73). The sterilant-rich gas stream on the permeate side of the membrane exits the first membrane separation unit through line (71) and is fed to a catalytic oxidation system or ion exchange resin system (67). The products of such process leave the unit (67) through line (68). The diluent-rich gas stream, which contains some sterilant, leaving the first membrane separation unit (63) through line (73) is fed to a second membrane separation unit (65). The sterilant-rich gas stream on the permeate side of the second membrane separation unit (65) leaves the unit through line (75) and is fed to a second catalytic oxidizer or ion exchange system (69). The products of such process leave the system (69) through line (70). The diluent-rich gas stream exiting the feed side of the second membrane separation unit (65) and line (77) is recycled back to the suction side of the pump (81) and re-fed to the first membrane separation unit (63) through line (79). In this way, the diluent-rich gas stream can be recycled through the membrane separation system until the level of sterilant within the diluent-rich stream has been depleted sufficiently. When this acceptable level of sterilant within the diluent is achieved, the diluent-rich stream may then be collected for re-use or disposal.

Figure 6:
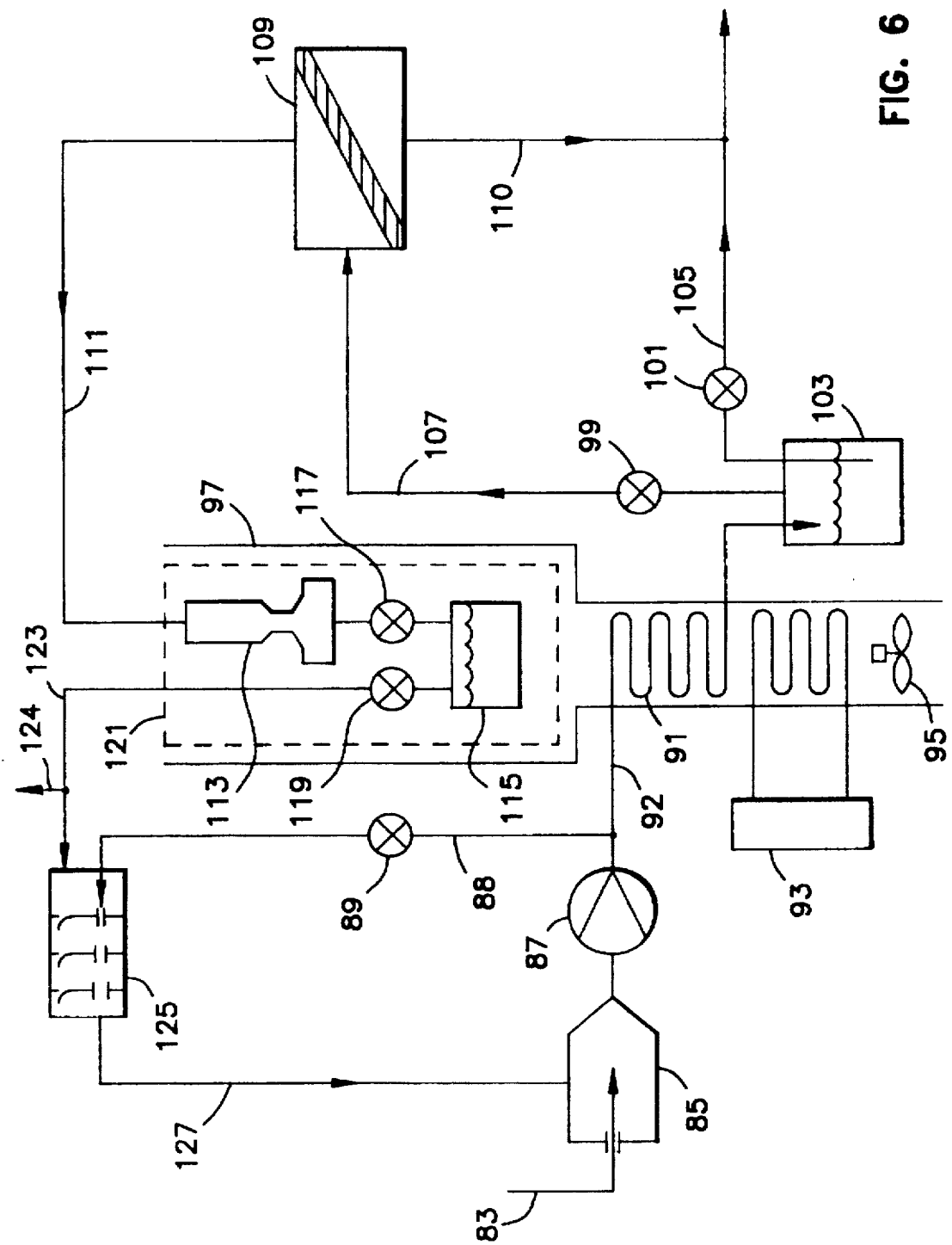
FIG. 6 is a schematic drawing of a membrane separation system in which a flow expansion cooling nozzle is utilized in conjunction with an ejector system to recover the diluent component for re-use.

Next referring to FIG. 6 which discloses a preferred embodiment of a process configuration incorporating recovery of the diluent-rich gas stream by means of condensation through a flow expansion cooling nozzle (113). The sterilant/diluent gas mixture, as previously disclosed, is fed to a low-pressure air ejector (85) through line (83) which feeds a pump (87) through line (92). A portion of the discharge stream from the pump, controlled in quantity by valve (89) is fed to the vacuum ejector (125) through line (88). This provides the source of vacuum for operating the flow expansion cooling nozzle (113) at the desired pressure ratio. The flow expansion cooling nozzle (113) may be of the subsonic or supersonic type depending on the temperature drop necessary for condensation of the diluent component. The discharge from the vacuum ejector (125) exits the unit through line (127) and is recycled back to the optional low pressure ejector (85). An alternative source for vacuum may be utilized in place of the vacuum ejector (125), such as a vacuum pump or any other vacuum source known to the art.

The sterilant/diluent gas mixture passes through a cooling coil (91) to a water drop-out tank (103). Cooling is provided by a refrigeration system (93) and blower (95). Although a cooling coil in conjunction with a fan is shown in FIG. 6, any refrigeration system known in the art which provides sufficient cooling to condense moisture within the sterilant/diluent mixture would suffice.

The non-condensed gas containing a sterilant and diluent exit the drop-out tank (103) through line (107) passing through valve (99) and is fed to a membrane. Separation unit (109). The sterilant-rich gas stream exits the permeate side of the membrane separation unit (109) through line (110) and is fed to a catalytic oxidation system or other sterilant recovery or treatment system, as previously disclosed. The diluent-rich gas stream exits the feed side of the membrane separation unit (109) through line (111) and is fed to the flow expansion cooling nozzle (113). Within the flow expansion cooling nozzle, the diluent-rich gas stream is cooled sufficiently by expansion to condense the diluent component, which drops out as a liquid in collection tank (115). The uncondensed portion of this stream exits the vapor space of the collection tank (115) through line (23) and passes through the vacuum ejector (125). When utilizing the vacuum-ejector system (125), the preferred embodiment, the uncondensed stream exiting the air-ejector (125) is recirculated through line (127) to the optional low pressure ejector (85).

The refrigeration system (93), in conjunction with the fan (95), are depicted in this embodiment as being utilized to supply supplemental cooling to the flow expansion cooling nozzle (113) and collection tank (115) in the enclosure (97) with insulation (121). When a sufficient quantity of condensed diluent is collected in collection tank (115), valves (117) and (119) may be closed when the unit is shut down and the collection tank removed and sent for such material contents to be re-used, recycled or discarded via a non-atmospheric disposal technique. Upon completion of a sterilant-removal cycle, the system disclosed in FIG. 6 has accumulated within such system a quantity of air along with a certain amount of condensed water in tank (103). If the quantity of air is too great during the processing of the sterilant/diluent gas mixture, a fraction may be released from the system through line (124) and recycled or vented depending on composition. These materials may be transferred from the system through line (105) by opening valve (101) and pass through the catalytic oxidation unit or other processing system as previously disclosed.

Figure 7:
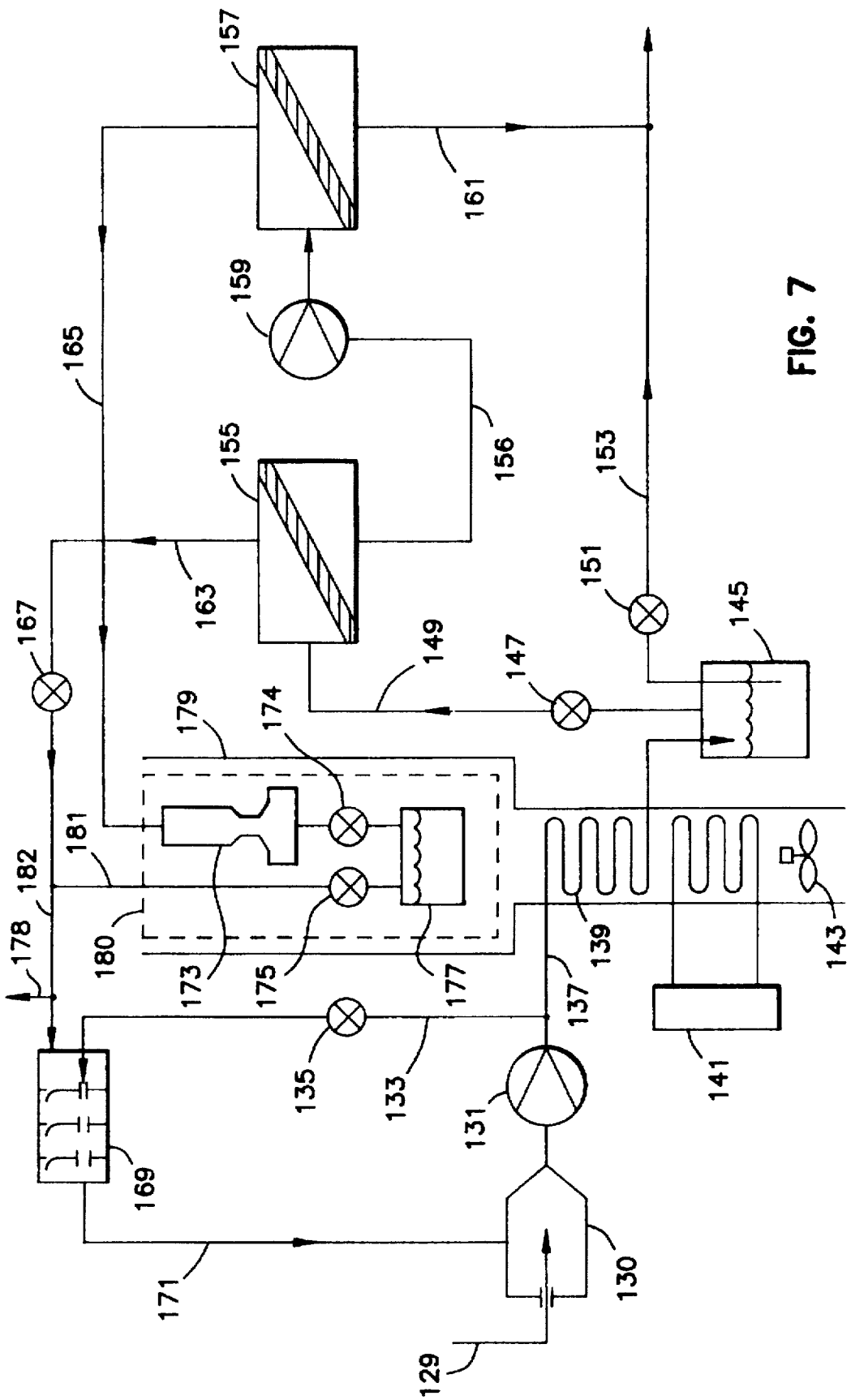
FIG. 7 is a schematic diagram of a membrane separation system in which a flow expansion cooling nozzle and ejector system is utilized to recover the diluent component while a two-stage membrane separation unit is utilized to recover the sterilant component.

Next refer to FIG. 7 which discloses a preferred embodiment which is a process similar to the process disclosed in FIG. 6, however, a second membrane separation stage is utilized to ensure adequate separation of the sterilant from diluent. The process incorporates recovery of the diluent-rich gas stream by means of condensation through a flow expansion cooling nozzle (173), the sterilant/diluent gas mixture, as previously disclosed, is fed to a low-pressure air ejector (130) through line (129) which feeds a pump (131) through line (137). A portion of the discharge stream from the pump controlled in quantity by valve (135) is fed to the vacuum ejector (169) through line (133). This provides the source of a vacuum for operating the flow expansion cooling nozzle (173) at the desired pressure ratio. The flow expansion cooling nozzle (173) may be of the subsonic or supersonic type depending on the temperature drop necessary for condensation of the diluent component. The discharge from the vacuum ejector (169) exits the unit through line (171) and is recycled back to the optional low pressure ejector (130). An alternative source for vacuum may be utilized in place of the vacuum ejector (169), such as a vacuum pump or other vacuum source known in the art.

The sterilant/diluent gas mixture passes through a cooling coil (139) to a water drop-out tank (145). Cooling is provided by a refrigeration system (141) and blower (143). Although a cooling coil in conjunction with a fan is shown in FIG. 7, any refrigeration system known in the art which provides sufficient cooling to condense moisture within the sterilant/diluent mixture would suffice. The non-condensed gas containing the sterilant and diluent exit the drop-out tank (145) through line (149) passing through valve (147) and is fed to a first membrane separation unit (155). The sterilant-rich gas stream exits the permeate side of the first membrane separation unit (155) through line (156). This stream feeds the suction side of a pump (159) which in turn feeds the sterilant-rich gas stream to a second membrane separation unit (157). The further purified sterilant-rich gas stream exits the permeate side of the second membrane separation unit through line (161) and is fed to a catalytic oxidation system or other sterilant-recovery system as previously disclosed.

The diluent-rich gas stream exits the feed side of the first membrane separation unit (155) through line (167) and is fed to the vacuum ejector (169). The diluent-rich gas stream exiting the feed side of the second membrane separation unit (157) is fed to the flow expansion cooling nozzle (173) through line (165). Within the flow expansion cooling nozzle, the diluent-rich gas stream is cooled sufficiently by expansion to condense the diluent component, which drops out as a liquid in collection tank (177). The uncondensed portion of this stream exits the vapor space of the collection tank (177) through line (182) and passes through the vacuum ejector (169). When utilizing the vacuum-ejector system (169), the preferred embodiment, the uncondensed stream exiting the vacuum ejector (169) is recirculated through line (171) to the optional low pressure ejector (130).

The refrigeration system (141), in conjunction with the fan (143), are depicted in this embodiment as being utilized to provide supplemental cooling to the flow expansion cooling nozzle (173) and collection tank (177) in the enclosure (179) with insulation (180). When a sufficient quantity of condensed diluent is collected in collection tank (177), valves (174) and (175) may be closed when the unit is shut down and the collection tank removed and sent for such material to be re-used, recycled or discarded via a non-atmospheric disposal technique. Upon completion of a sterilant-removal cycle, the system disclosed in FIG. 7 has accumulated within such system a quantity of air, along with a certain amount of condensed water in tank (145). If the quantity of air is too great during the processing of the sterilant/diluent gas mixture, a fraction may be released from the system through line (178) and recycled or vented depending on composition. These materials may be transferred from the system through line (153) by opening valve (151) and pass this stream through the catalytic oxidation unit or other sterilant processing system as previously disclosed.

Figure 8:
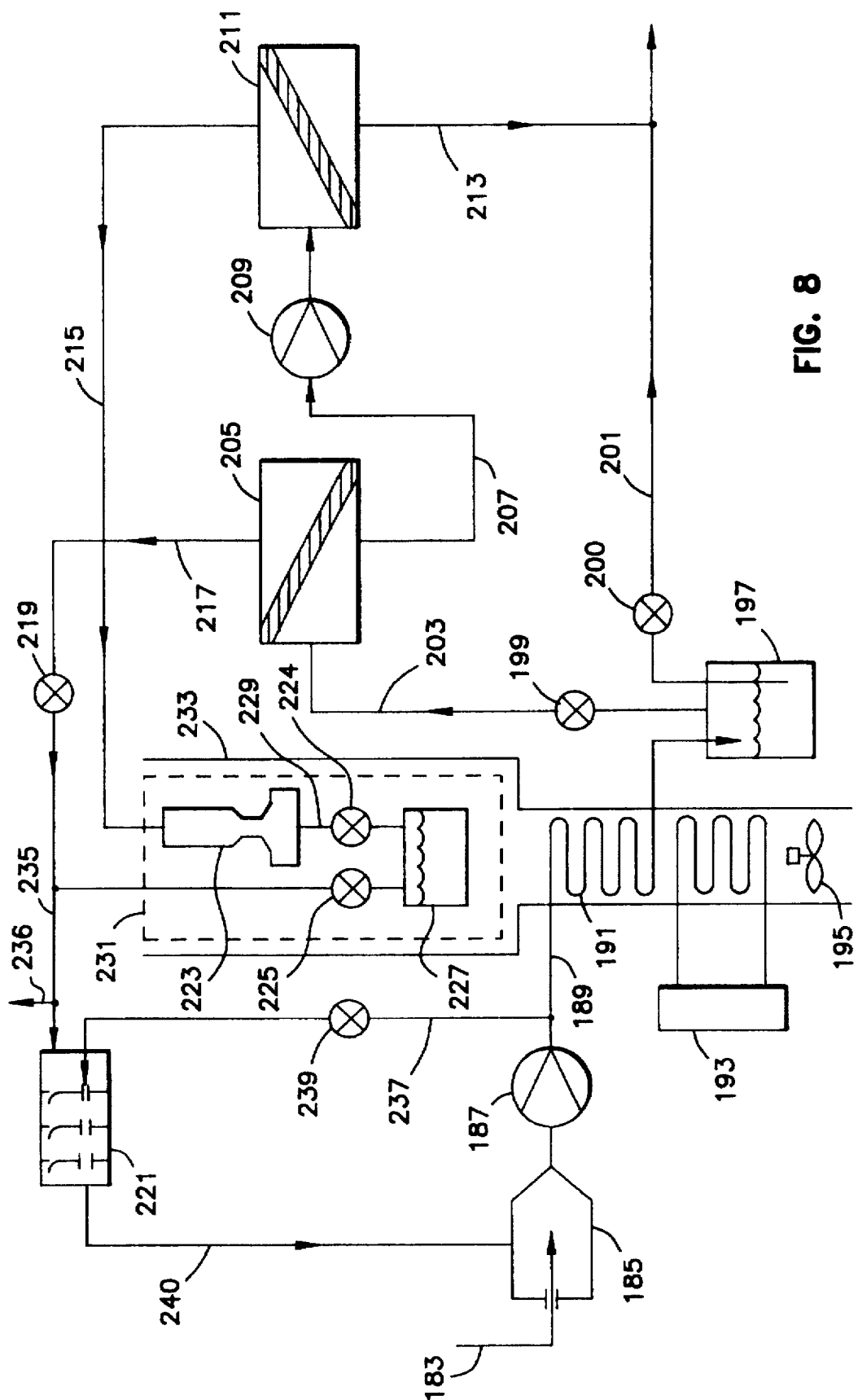
FIG. 8 is a schematic diagram of a membrane separation system which utilizes a flow expansion cooling nozzle and ejector system to recover the diluent and a two-stage membrane separation process to first separate air from the mixture, followed by membrane separation of sterilant from diluent.

Next refer to FIG. 8 which discloses a multi-stage membrane separation system in conjunction with a flow expansion cooling nozzle for diluent recovery. The system incorporates recovery of the diluent-rich gas stream by means of condensation through a flow expansion cooling nozzle (223). The sterilant/diluent gas mixture, as previously disclosed, is fed to a low-pressure air ejector (185) through line (183) which feeds a pump (187) through line (189). A portion of the discharge stream from the pump controlled in quantity by valve (239) is fed to the vacuum ejector (221) through line (237). This provides the source of a vacuum for operating the flow expansion cooling nozzle (223) at the desired pressure ratio. The flow expansion cooling nozzle 223 may be of the subsonic or supersonic type depending on the temperature drop necessary for condensation of the diluent component. The discharge from the vacuum ejector (221) exits the unit through line (240) and is recycled back to the optional low pressure ejector (185). An alternative source for vacuum may be utilized in place of the vacuum ejector (221), such as a vacuum pump or any other vacuum source known in the art.

The sterilant/diluent gas mixture passes through a cooling coil (191) to a water drop-out tank (197). Cooling is provided by a refrigeration system (193) and blower (195). Although a cooling coil in conjunction with a fan is shown in FIG. 8, any refrigeration system known in the art which provides sufficient cooling to condense moisture within the sterilant/diluent mixture would suffice. The non-condensed gas containing the sterilant and diluent exit the drop-out tank (197) through line (203), passing through valve (199), and is fed to a first membrane separation unit (205). The first membrane separation unit (205) utilizes a membrane which allows most of the air and some of the diluent to pass through the membrane to the permeate side. This stream exits the first membrane separation unit (205) through line (217) and is fed to the vacuum ejector (221).

The stream exiting the feed side of the first membrane separation unit through line (20) contains most of the sterilant and diluent components and is fed to a pump (209), which in turn feeds a second membrane separation unit (211) containing a membrane which selectively separates sterilant from diluent.

The sterilant-rich gas stream exits the permeate side of the second membrane separation unit (211) through line (213) and is fed to a catalytic oxidation system or other sterilant-recovery system, as previously disclosed. The diluent-rich gas stream exits the feed side of the second membrane separation unit (211) through line (215) and is fed to the flow expansion cooling nozzle (223). Within the flow expansion cooling nozzle, the diluent-rich gas stream is cooled by expansion sufficiently to condense the diluent component, which drops out as a liquid in collection tank (227). The uncondensed portion of this stream exits the vapor space of the collection tank (227) through line (235) and passes through the vacuum ejector (221). When utilizing the vacuum-ejector system (221), a preferred embodiment, the uncondensed stream exiting the vacuum ejector (221) is recirculated through line (240) to the optional low pressure ejector (185).

The refrigeration system (193), in conjunction with the fan (195), are depicted in this embodiment as being utilized to provide supplemental cooling to the flow expansion cooling nozzle (223) and collection tank (227) in the enclosure (223) with insulation (231). When a sufficient quantity of condensed diluent is collected in the collection tank (227), valves (224) and (225) may be closed when the unit is shut down and the collection tank removed and sent for such material to be re-used, recycled or discarded via a non-atmospheric disposal technique. Upon completion of a sterilant-removal cycle, the system disclosed in FIG. 8 has accumulated within such system a quantity of air along with a certain amount of condensed water in tank (197). If the quantity of air is too great during processing of the sterilant/diluent gas mixture, a fraction may be released from the system through line (236) and recycled or vented depending on composition. These materials may be transferred from the system through line (201) by opening valve (200) and pass through the catalytic oxidation unit or other processing system as previously disclosed.

Figure 9:
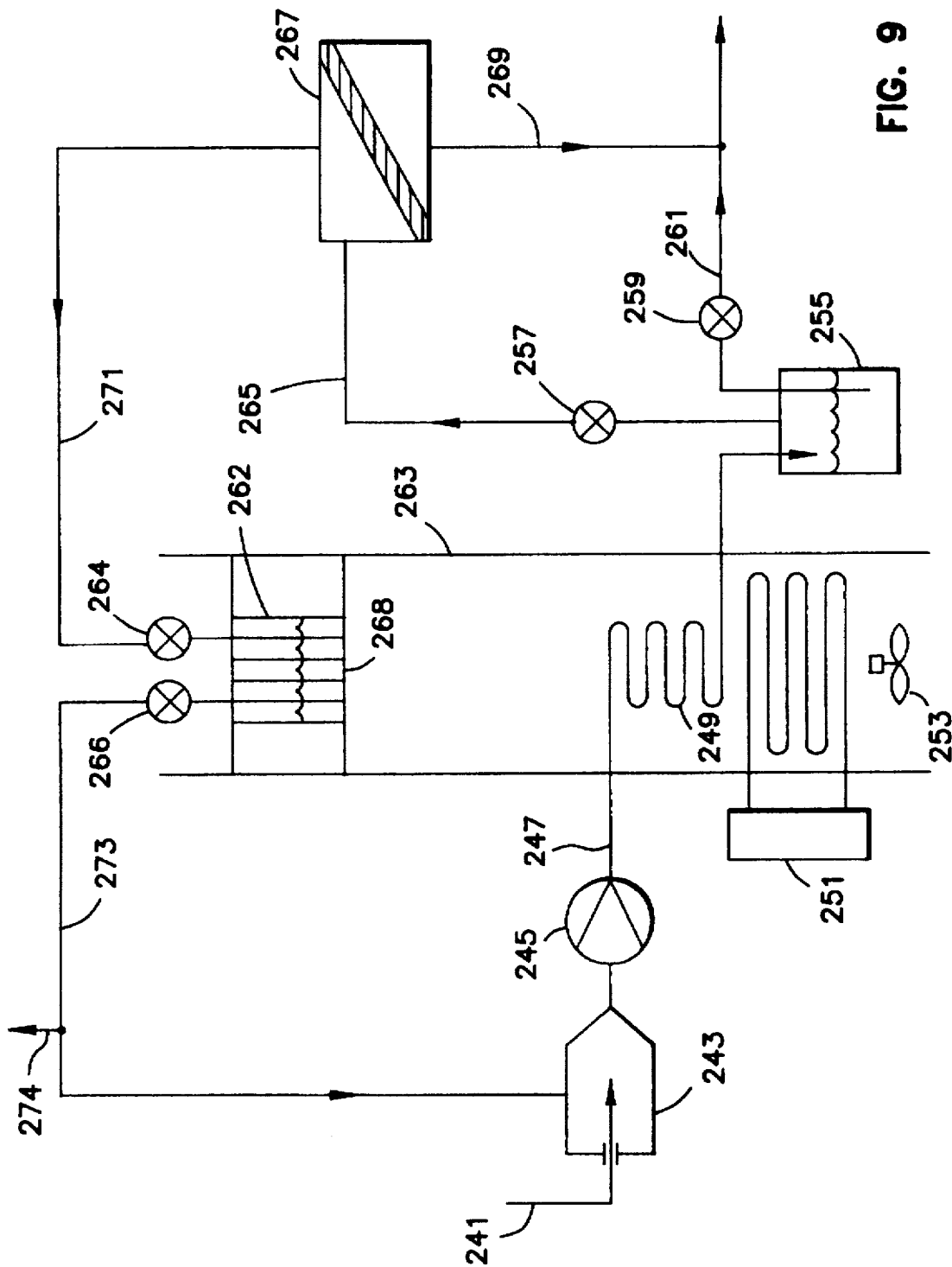
FIG. 9 is a schematic diagram of a membrane separation system in which a condenser/heat-exchanger system is utilized to condense the diluent component while a membrane separation unit is utilized to separate the sterilant component; and, FIG. 10 is a schematic drawing of a membrane separation system utilizing a compression/condensation process followed by a condenser/heat-exchanger system to recover the diluent component while a membrane separation unit is utilized to recover the Sterilant component.

Next refer to FIG. 9 which discloses a preferred embodiment using a large refrigeration system to condense the purified diluent stream for recycle back to the manufacturer or other user of recycled diluent.

The sterilant/diluent gas mixture, as previously disclosed, is fed to a low-pressure air ejector (243) through line (241) which feeds a pump (245) through line (247). The sterilant/diluent gas mixture passes through a cooling coil (249) to a water drop-out tank (255). Cooling is provided by a refrigeration system (251) and blower (253). Although a cooling coil in conjunction with a fan is shown in FIG. 9, any refrigeration system known in the art which provides sufficient cooling to condense moisture within the sterilant/diluent mixture would suffice. The non-condensed gas containing the sterilant and diluent exit the drop-out tank (255) through line (265) passing through valve (257) and is fed to a membrane separation unit (267). The sterilant-rich gas stream exits the permeate side of the membrane separation unit (267) through line (269) and is fed to a catalytic oxidation system or other sterilant-recovery system as previously disclosed.

The diluent-rich gas stream exits the feed side of the membrane separation unit (267) through line (271) and is fed through a heat exchanger (262) to condense the diluent which is collected in a collection tank (268).

The uncondensed portion of this stream exits the vapor space of the collection tank (268) through line (273) and may be recycled back to the optional low pressure ejector (243) or alternatively vented through line (274) depending on composition.

When a sufficient quantity of condensed diluent is collected in collection tank (268), valves (264) and (266) may be closed when the unit is shut down and the collection tank removed and sent for such material to be re-used, recycled or discarded via a non-atmospheric disposal technique. Upon completion of a sterilant-removal cycle, the system disclosed in FIG. 9 has accumulated within such system a quantity of air along with a certain amount of condensed water in tank (255). These materials may be transferred from the system through line (261) by opening valve (259) and pass through the catalytic oxidation unit or other sterilant processing system as previously disclosed.

Figure 10:
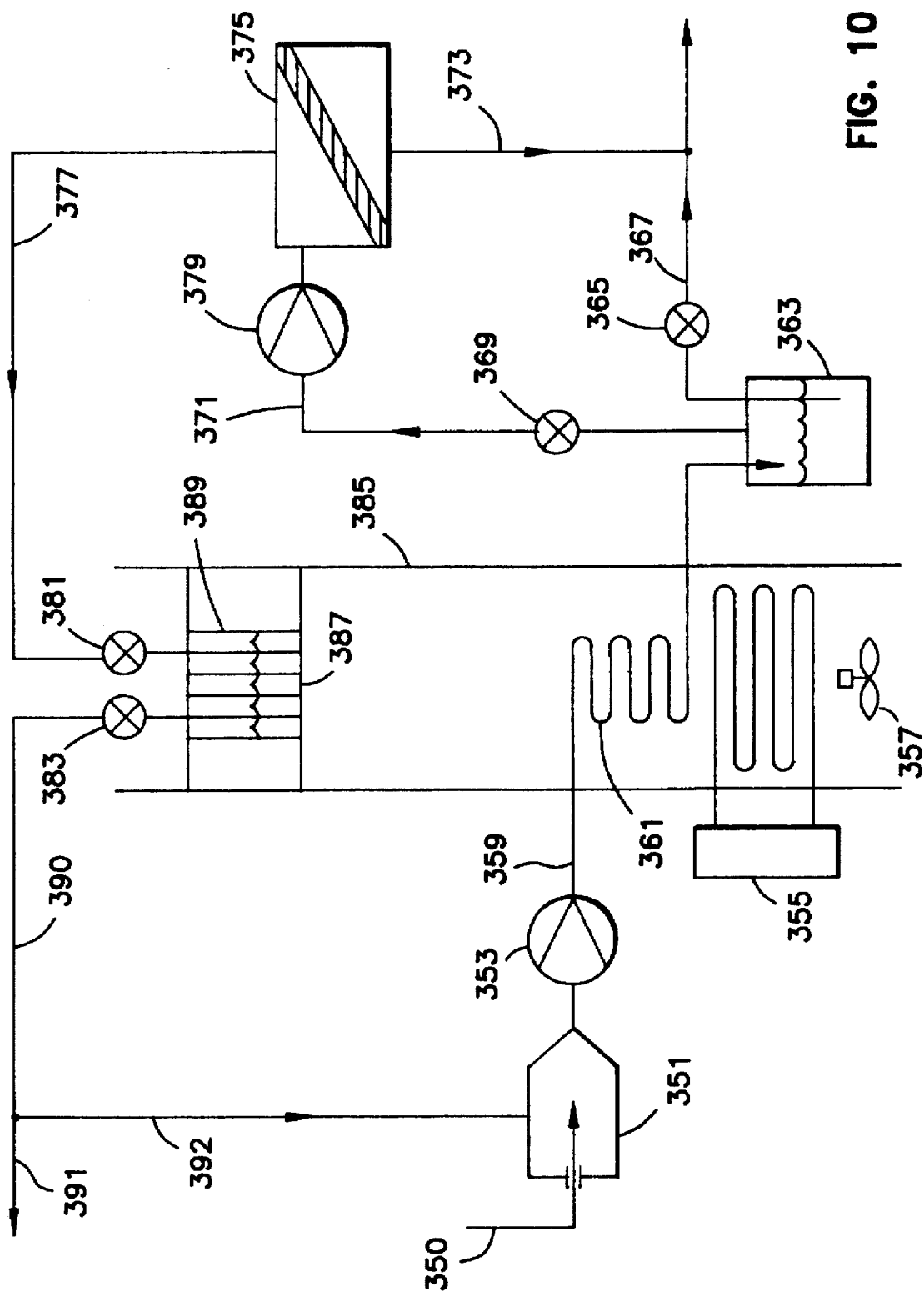

Next refer to FIG. 10 which discloses a preferred embodiment further utilizing a compression condensation system (379) prior to feeding the diluent-rich gas stream to a high differential temperature cooling system to further condense the diluent-rich gas stream. The compression/condensation system would include any compressor system known to the art. The sterilant/diluent gas mixture, as previously disclosed, is fed to a low-pressure air ejector (351) through line (350) which feeds a pump (357) through line (359). The sterilant/diluent gas mixture passes through a cooling coil (361) to a water drop-out tank (363). Cooling is provided by a refrigeration system (355) and blower (357). Although a cooling coil in conjunction with a fan is shown in FIG. 10, any refrigeration system known in the art which provides sufficient cooling to condense moisture within the sterilant/diluent mixture would suffice. The non-condensed gas containing the sterilant and diluent exit the drop-out tank (363) through line (371) passing through valve (369) and feeds a pump (379). The pump (379) feeds the sterilant/diluent gas mixture to a membrane separation unit (375). The sterilant-rich gas stream exits the permeate side of the membrane separation unit (375) through line (373) and is fed to a catalytic oxidation system or other sterilant-recovery or treatment system as previously disclosed.

The diluent-rich gas stream which was compressed in pump (379) exits the feed side of the membrane separation unit (375) through line (377). The compressed diluent-rich gas, which may be partially condensed, along with any condensed diluent is fed to the heat exchanger (389) to complete condensation of the diluent. The condensed diluent component drops out as a liquid in collection tank (387).

The uncondensed portion of this stream exits the vapor space of the collection tank (387) through line (390). The uncondensed stream exiting the collection tank (387) may be recirculated through line (392) to the optional low pressure ejector (351) or alternatively vented to the atmosphere through line (391).

When a sufficient quantity of condensed diluent is collected in collection tank (387), valves (383) and (381) may be closed when the unit is shut down and the collection tank removed and sent for such material to be re-used, recycled or discarded via a non-atmospheric disposal technique. Upon completion of a sterilant-removal cycle, the system disclosed in FIG. 10 has accumulated within such system a quantity of air along with a certain amount of condensed water in tank (363). These materials may be transferred from the system through line (367) by opening valve (365) and pass through the catalytic oxidation unit or other sterilant processing system, as previously disclosed.

EXAMPLE 1

A sterilant/diluent mixture (Oxyfume® Sterilant Mixture 12, manufactured by Linde, a 12 weight percent mixture of ethylene oxide and 88 weight percent dichlorodifluoromethane) was added to a commercially-available styrene butadiene latex balloon (manufactured by The National Latex Products Co., Ashland, Ohio) to a pressure of 40 PSIG. An initial sample of the sterilant/diluent mixture was analyzed by gas chromatography (GC). The GC utilized was a Shimazou GC Mini 2 with FID, a Shimazou Chromatopac C R3A integrator with a column consisting of a 6-foot by ⅛ inch O.D. Stainless-Chromasorb 102 80/100 material. The sample size was 10 microliters gas with direct injection. Gas flows to the system included 50 milliliters per minute helium as carrier gas, 55 milliliters per minute hydrogen and 250 milliliters per minute air. Column temperature was 115° C. while the injector/detector temperature was 180° C. The resulting chromatogram defined two distinct peaks whose area count was utilized as a relative measure of ethylene oxide and dichlorodifluoromethane concentrations.

After one hour, the contents of the latex balloon were sampled and analyzed by the above GC method. Area counts for the ethylene oxide and dichlorodifluoromethane peaks were utilized again as the measure of relative concentration of each component. The change in area count for each component from the initial GC analysis to the analysis of the sample taken one hour later defines the relative selectivity of the membrane material for separating the sterilant from the diluent gas. The test results are summarized in Table 1 below.

Tests utilizing other membrane materials, but duplicative of the procedure of the above test for the styrene butadiene latex balloon were completed. The membrane materials tested were a commercially available latex glove on which two tests were completed and summarized in Table 1, a poly-vinyl chloride (PVC) glove supplied by Fisher Scientific, Model No. 11-384-36C one test was completed with results also summarized in Table 1 and a nitrile glove manufactured by Best Manufacturing Company, Style No. 70055, on which one test was completed with results again summarized in Table 1 below.

TABLE 1

GC Results of Membrane Tests Showing Relative Selectivity

| Material | CFC Fresh | CFC 1 Hour | ETO Fresh | ETO 1 Hour | ETO Ratio (Fresh/1 Hour) |
|---|---|---|---|---|---|
| Latex Balloon | 150,000 | 153,000 | 57,232 | 248 | 230 |
| Latex Glove | 77,000 | 72,000 | 29,831 | 1,675 | 17.8 |
| Latex Glove | 138,000 | 141,000 | 56,251 | 2,635 | 21.3 |
| P V C Glove | 119,000 | 142,000 | 47,767 | 11,784 | 4.05 |
| Nitrile Glove | 132,000 | 149,000 | 82,561 | 44,212 | 1.87 |

As the results in Table 1 indicate, the membrane materials tested all have a preference for migration of ethylene oxide over migration of the dichlorodifluoromethane. This is indicated by the relatively constant area count for dichlorodifluoromethane in the fresh sterilant/diluent mixture and the mixture sampled after one hour from inside the membrane material enclosure and the dramatic change in area count for the ethylene oxide measured in the fresh mixture versus the mixture sampled after one hour. The test results for the styrene butadiene latex balloon indicate that this membrane material allows the fastest relative transport of ethylene oxide through the membrane material, followed by the latex glove, PVC glove and nitrile glove, respectively.

EXAMPLE 2

An apparatus was constructed to test the amount of migration of dichlorodifluoromethane through a membrane that also allowed migration of the ethylene oxide. A 1/16" thick by 1/4" inside diameter medical grade silicone tubing (manufactured by Baxter Corp., Catalog No. T5715-24, Sp. Medical Grade) was cut into a 14" length and capped on one end. The open end of this tubing was connected to a source of sterilant/diluent mixture (Oxyfume® 12 the material of Example 1) with constant pressure into the tube of 40 PSIG. This silicone tubing was enclosed in a one inch diameter copper tubing which also had one end capped while the open end was connected to a vacuum pump. Vacuum was drawn on the open end of the copper tube initially and then a valve was closed. After one hour, a gas sample was taken from the outside of the silicone tube, inside of the copper tubing. The sample was analyzed by gas chromatography (the GC method and equipment of Example 1) to determine the relative concentrations of ethylene oxide and dichlorodifluoromethane. Ethylene oxide was the only component detected in the sample, indicating that the silicone tubing produced a good separation of ethylene oxide from dichlorodifluoromethane and would be an effective membrane material.

EXAMPLES 3–10

An apparatus was constructed to test the performance of a membrane under continuous operation. A commercially-available hollow fiber bundle, composed of plasma-polymerized siloxanes on a porous polypropylene fiber (supplied by Applied Membrane Technology, Minnetonka, Minn.) was used as the membrane material. The feed side of the membrane was connected to a source of sterilant/diluent (Oxyfume® 12 of Example 1) with a constant feed pressure and continuous supply of gas mixture. The permeate side of the hollow fiber bundle was connected to a catalytic oxidizer, while the outlet from the feed side of the hollow fiber bundle was connected to a collection vessel. The results of tests conducted on this system are summarized in Table 2 below. In Examples 3–6, a hollow fiber bundle of 2 sq. ft. surface area was utilized, while in Examples 7–10, a hollow fiber bundle of surface area 1 sq. ft. was utilized. As indicated in Table 2, the tests were done at feed pressures of 30 PSIG and 15 PSIG for each size membrane and a test was further conducted at each feed pressure on each membrane at vacuum conditions on the permeate side of the membrane of 0 inches mercury (atmospheric pressure) and 5 inches mercury.

TABLE 2

| | Membrane Performance | | | | | | |
|---|---|---|---|---|---|---|---|
| Exam. | Membrane Surface Area | Feed Pressure (PSI) | Permeate Vacuum (in Hg) | EO Permeate (l/min) | Abator Temp (Deg F.) | Freon % Recov. | Freon Recov. (l/min) |
| 3 | 2 | 30 | 0 | 1.5 | 333 | 75 | 3.64 |
| 4 | 2 | 30 | 5 | 2.04 | 335 | 77 | 3.85 |
| 5 | 2 | 15 | 0 | 0.35 | 324 | 89 | 2.11 |
| 6 | 2 | 15 | 5 | 0.806 | 325 | 77 | 2.25 |
| 7 | 1 | 30 | 0 | 0.87 | 339 | 83 | 3.7 |
| 8 | 1 | 30 | 5 | 2.88 | 340 | 67 | 3.7 |
| 9 | 1 | 15 | 0 | 2.75 | 326 | 78 | 2.0 |
| 10 | 1 | 15 | 5 | 1.26 | 327 | 68 | 1.89 |

As can be seen from the above table, ethylene oxide moves much faster than dichlorodifluoromethane through the membrane in each example. The efficiency of the membrane varies with feed pressure, permeate vacuum and surface area of the membrane.

Applicants believe these examples and description of proposed configurations of the present process demonstrate the overall feasibility and advantages of the invention disclosed herein and covered by the claims appended hereto. It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A process for treating a gas mixture which is an exhaust gas from a chemical sterilization unit, said gas mixture including a sterilant gas and a diluent gas, said process consisting essentially of the steps of:

(a) feeding said gas mixture into a membrane separation unit to first separate said sterilant gas from said diluent gas prior to treatment or recovery of either, said membrane separation unit including a membrane which allows a preferential migration of said sterilant gas through said membrane, wherein said gas mixture comes into contact with said membrane within said membrane separation unit and the sterilant gas is concentrated by the preferential passage of the sterilant gas through the membrane; and (b) withdrawing both a diluent-rich gas stream and a sterilant-rich gas stream out of the membrane separation unit.

* * * * *

UNITED STATES PATENT AND TRADEMARK OFFICE
CERTIFICATE OF CORRECTION

PATENT NO. : 5,698,011
DATED : DECEMBER 16, 1997
INVENTOR(S) : CHUNG ET AL.

It is certified that error appears in the above-identified patent and that said Letters Patent is hereby corrected as shown below:

In the Abstract, line 13, "(CFC-1)" should read —(CFC-12)—.

In column 5, line 20, "Unit" should read —unit—.

In column 11, line 54, "Units" should read —units—.

In column 14, line 14, "membrane. Separation" should read —membrane separation—.

Signed and Sealed this

Eighth Day of September, 1998

Attest:

BRUCE LEHMAN

*Attesting Officer*    Commissioner of Patents and Trademarks